(12) United States Patent
Chang (10) Patent No.: US 8,090,079 B2
(45) Date of Patent: Jan. 3, 2012

(54) SYSTEM AND METHOD FOR AUTO-REVERSING LOOP POLARITY OF U INTERFACE

(75) Inventor: Kai-Yen Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1299 days.

(21) Appl. No.: 11/734,795

(22) Filed: Apr. 13, 2007

(65) Prior Publication Data

US 2007/0280427 A1    Dec. 6, 2007

(30) Foreign Application Priority Data

Apr. 21, 2006   (TW) ............................... 95114432 A (51) Int. Cl.
*H04M 1/24* (2006.01)
*H04M 3/08* (2006.01)
*H04M 3/22* (2006.01)
(52) U.S. Cl. .................. 379/27.01; 379/29.04
(58) Field of Classification Search .............. 379/24, 379/26.01, 27.01, 27.06, 28, 29.03, 29.04, 379/32.01, 395.01
See application file for complete search history.

(56) References Cited

U.S. PATENT DOCUMENTS

| | | | |
|---|---|---|---|
| 4,434,324 A | | 2/1984 | Boggio et al. |
| 5,099,497 A | * | 3/1992 | Ohno et al. .................... 375/293 |
| 5,970,099 A | * | 10/1999 | Zhou ............................. 375/285 |
| 6,320,940 B1 | * | 11/2001 | Oi ............................... 379/27.01 |
| 7,130,274 B2 | * | 10/2006 | Chang et al. .................... 370/242 |

* cited by examiner

*Primary Examiner* — Quoc D Tran
(74) *Attorney, Agent, or Firm* — Altis Law Group, Inc.

(57) ABSTRACT

A loop polarity auto-reversing system 100 of a U interface is disposed in a line terminal 10 connected to a digital service unit 20 via the U interface. The loop polarity auto-reversing system includes a current detection module 101, a loop polarity determining module 103, and a loop polarity reversing module 105. The current detection module is for detecting whether there is loop current at the U interface. The loop polarity determining module is for determining whether a loop polarity of the U interface is correct if there is loop current. The loop polarity reversing module is for reversing the loop polarity of the U interface if the loop polarity is incorrect. An auto-reversing method for reversing the loop polarity of the U interface is also provided.

13 Claims, 13 Drawing Sheets

SYSTEM AND METHOD FOR AUTO-REVERSING LOOP POLARITY OF U INTERFACE

BACKGROUND OF THE INVENTION

1. Field of the Invention

The present invention relates to systems and methods for auto-reversing loop polarity, and specifically to a system and method for auto-reversing loop polarity of a U interface.

2. Description of Related Art

In a conventional integrated services digital network (ISDN), user terminals are usually connected to a line terminal via a digital service unit, and are connected to an exchange terminal via the line terminal. The digital service unit is connected to the line terminal via a U interface.

However, the digital service unit is usually manually assembled, and it may abnormally communicate with the line terminal while a loop polarity of the U interface is incorrect. Thus, the user terminal cannot work normally, and users need to reverse the loop polarity of the U interface, which may be inconvenient and unsuitable.

Therefore, a heretofore unaddressed need exists in the industry to overcome the aforementioned deficiencies and inadequacies.

SUMMARY OF THE INVENTION

An exemplary embodiment of the present invention provides a loop polarity auto-reversing system of a U interface, which is disposed in a line terminal, and the line terminal connected to a digital service unit via the U interface. The loop polarity auto-reversing system includes a current detection module, a loop polarity determining module, and a loop polarity reversing module. The current detection module is for detecting whether there is loop current at the U interface. The loop polarity determining module is for determining whether a loop polarity of the U interface is correct if there is loop current. The loop polarity reversing module is for reversing the loop polarity of the U interface if the loop polarity is incorrect.

Another exemplary embodiment of the present invention provides a loop polarity auto-reversing method of a U interface, which is implemented in a line terminal, and the line terminal connected to a digital service unit via the U interface. The loop polarity auto-reversing method includes: detecting whether there is loop current at the U interface of the line terminal; determining whether a loop polarity of the U interface is correct if there is loop current; and reversing the loop polarity of the U interface of the line terminal if the loop polarity of the U interface is incorrect.

Other advantages and novel features will become more apparent from the following detailed description when taken in conjunction with the accompanying drawings, in which:

DETAILED DESCRIPTION OF THE INVENTION

Figure 1:
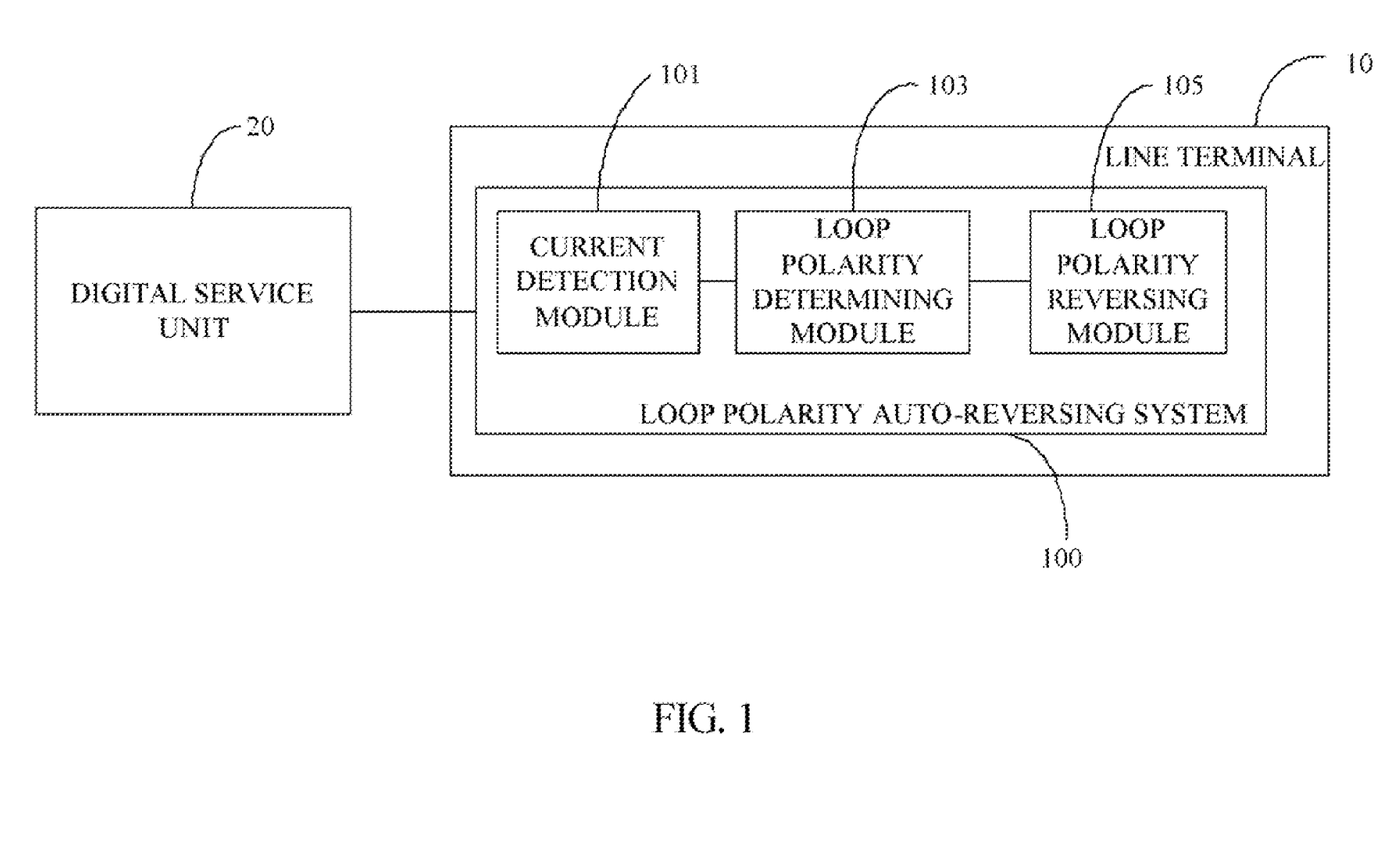
FIG. 1 is a block diagram of a loop polarity auto-reversing system of a U interface of an exemplary embodiment of the present invention.

FIG. 1 is a block diagram of a loop polarity auto-reversing system 100 of a U interface (hereinafter referred as auto-reversing system 100) of an exemplary embodiment of the present invention. In the embodiment, a line terminal 10 is connected to the digital service unit 20 via a U interface thereof (not shown), and the auto-reversing system 100 is disposed in the line terminal 10. The auto-reversing system 100 includes a current detection module 101, a loop polarity determining module 103, and a loop polarity reversing module 105.

The current detection module 101 is for detecting whether there is loop current at the U interface between the line terminal 10 and the digital service unit 20, and the loop polarity determining module 103 is started if there is loop current.

The loop polarity determining module 103 is for determining whether the loop polarity of the U interface is correct, and the loop polarity reversing module 105 is started if the loop polarity is incorrect.

The loop polarity reversing module 105 is for reversing the loop polarity of the U interface of the line terminal 10.

Figure 2:
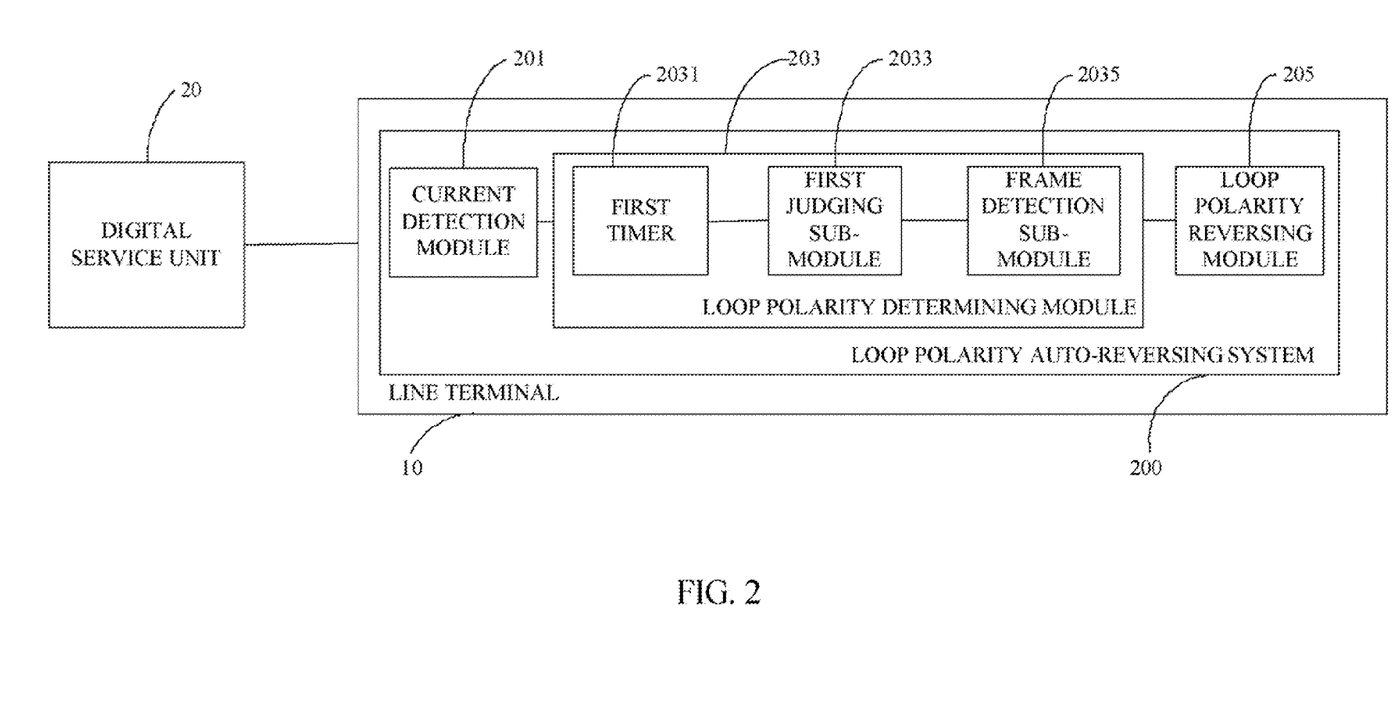
FIG. 2 is a block diagram of a loop polarity auto-reversing system of a U interface of another exemplary embodiment of the present invention.

FIG. 2 is a block diagram of a loop polarity auto-reversing system 200 of a U interface (hereinafter referred as the auto-reversing system 200) of another exemplary embodiment of the present invention. The auto-reversing system 200 includes a current detection module 201, a loop polarity determining module 203, and a loop polarity reversing module 205.

The auto-reversing system 200 is similar to the auto-reversing system 100 of FIG. 1, except that the loop polarity determining module 203 includes a first timer 2031, a first judging sub-module 2033, and a frame detection sub-module 2035, therefore, descriptions of the current detection module 201 and the loop polarity reversing module 205 are omitted.

The first timer 2031 is for timing according to a preset cycle time. In the embodiment, the preset cycle time must be longer than a synchronous period to synchronize the line terminal 10 and the digital service unit 20. The first judging sub-module 2033 is for judging whether the first timer 2031 has elapsed, and the frame detection sub-module 2035 is started if the first timer 2031 has not elapsed. The frame detection sub-module 2035 is for detecting whether the frames between the line terminal 10 and the digital service unit 20 are synchronized in a first preset cycle time. In the embodiment, if the frames are not synchronized in the first preset cycle time, that is, if the frames are not synchronized before the first timer 2031 has elapsed, the loop polarity reversing module 205 is started.

Figure 3:
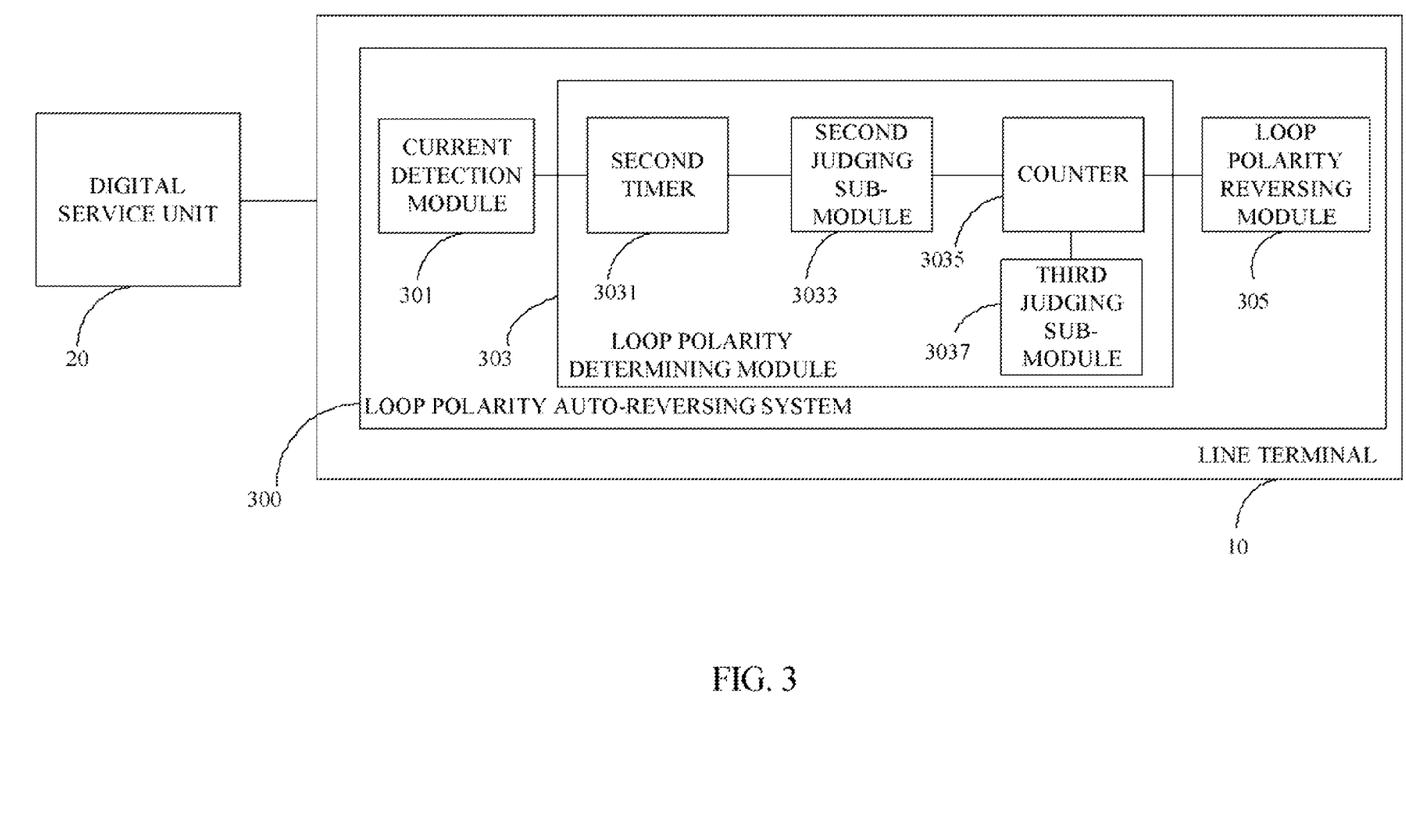
FIG. 3 is a block diagram of a loop polarity auto-reversing system of a U interface of a further exemplary embodiment of the present invention.

FIG. 3 is a block diagram of a loop polarity auto-reversing system 300 of a U interface (hereinafter referred as the auto-reversing system 300) of a further exemplary embodiment of the present invention. The auto-reversing system 300 includes a current detection module 301, a loop polarity determining module 303, and a loop polarity reversing module 305.

The auto-reversing system 300 is similar to the auto-reversing system 100 of FIG. 1, except that the loop polarity determining module 303 includes a second timer 3031, a second judging sub-module 3033, a counter 3035, and a third judging sub-module 3037, therefore, descriptions of the current detection module 301 and the loop polarity reversing module 305 are omitted.

The second timer 3031 is for recording a system time when detecting variations of the loop current. The second judging sub-module 3033 is for judging whether a time difference $T_d$ of two continuous variations of the loop current is in an open interval (A−x, A+x) ms. In the embodiment, the value A is a preset value, i.e. 40 ms, and the value x is a system error value. The counter 3035 is for recording times (hereinafter referred as a value C) that the time difference $T_d$ is in the open interval (A−x, A+x) ms. The third judging sub-module 3037 is for judging whether the value C is greater than a preset first threshold value. If the value C is greater than the first threshold value, the third judging sub-module 3037 resets the counter 3035 to 0, and starts the loop polarity reversing module 305.

Figure 4:
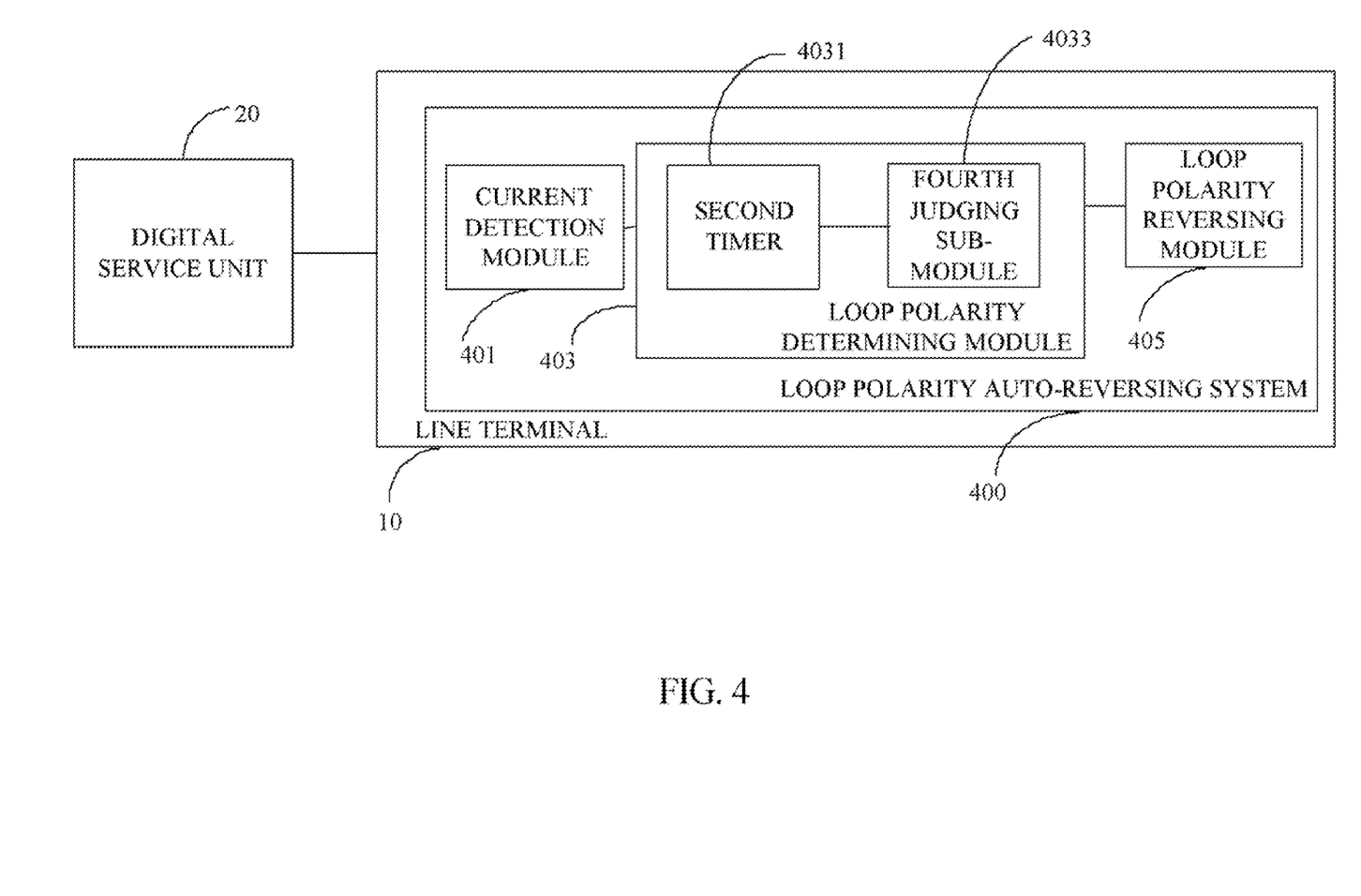
FIG. 4 is a block diagram of a loop polarity auto-reversing system of a U interface of a still further exemplary embodiment of the present invention.

FIG. 4 is a block diagram of a loop polarity auto-reversing system 400 of a U interface (hereinafter referred as the auto-reversing system 400) of a still further exemplary embodiment of the present invention. The auto-reversing system 400 also includes a current detection module 401, a loop polarity determining module 403, and a loop polarity reversing module 405.

The auto-reversing system 400 is similar to the auto-reversing system 100 of FIG. 1, except that the loop polarity determining module 403 includes a second timer 4031 and a fourth judging sub-module 4033, therefore, descriptions of the current detection module 401 and the loop polarity reversing module 405 are omitted.

The second timer 4031 is for recording a system time when detecting a variation of the loop current. In the embodiment, the second timer 4031 records every system time in a first queue having M+1 sequences in sequence, and records the system time when the system varies for a (i+1)th time in an ith sequence of the first queue (i=1, 2, ... M+1).

The fourth judging sub-module 4033 is for judging whether a time difference $T_m$ of M times continuous variations of the loop current is less than a preset second threshold value. If the time difference $T_m$ is less than the preset second threshold value, the fourth judging sub-module 4033 resets the first queue to 0, and starts the loop polarity reversing module 405. In the embodiment, the preset second threshold value is equal to (M*A+x) ms, wherein the value A is equal to 40 ms, and the value x is a system error value.

Figure 5:
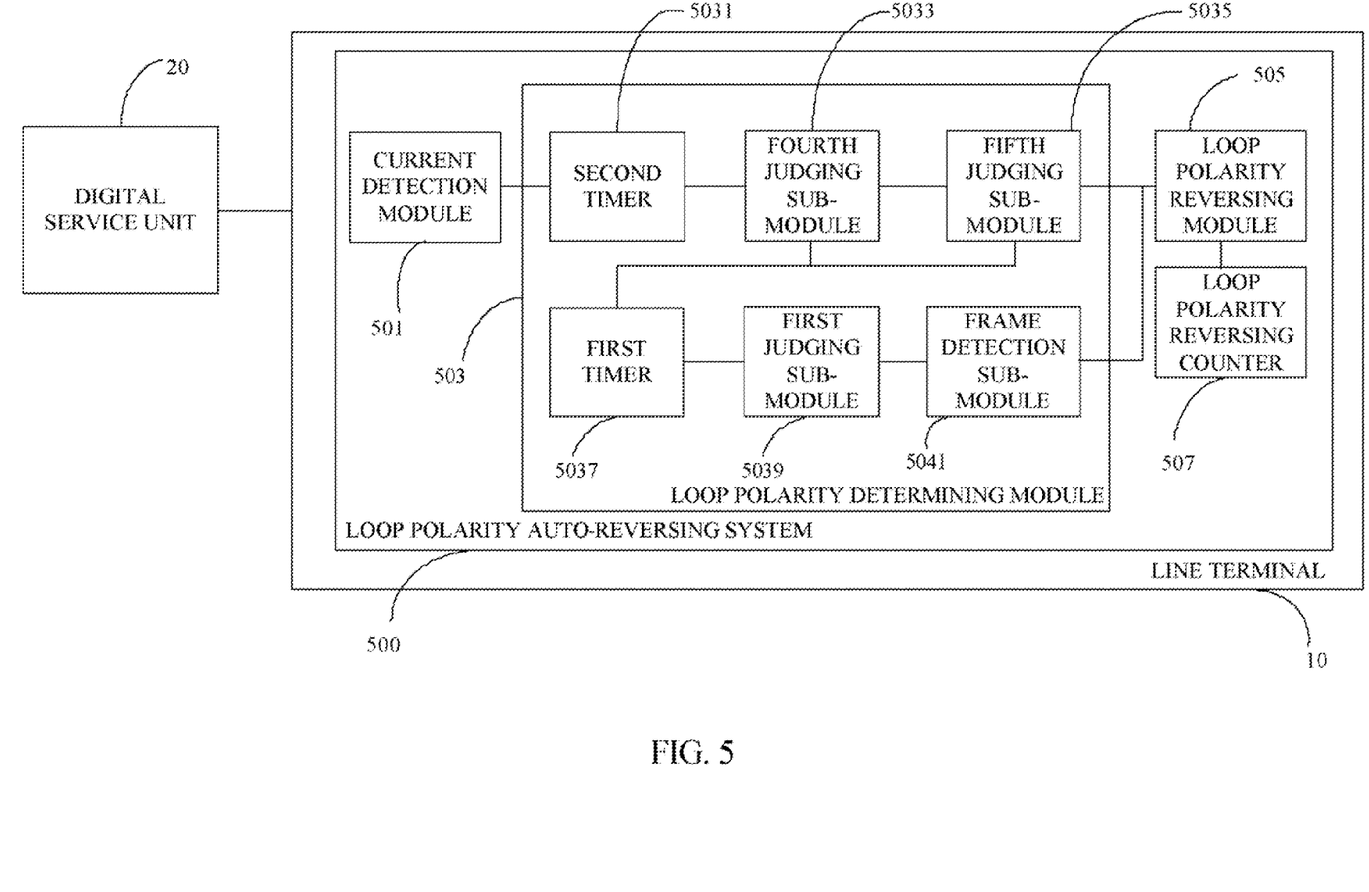
FIG. 5 is a block diagram of a loop polarity auto-reversing system of a U interface of a yet further exemplary embodiment of the present invention.

FIG. 5 is a block diagram of a loop polarity auto-reversing system 500 of a U interface (hereinafter referred as the auto-reversing system 500) of a yet further exemplary embodiment of the present invention. The auto-reversing system 500 also includes a current detection module 501, a loop polarity determining module 503, a loop polarity reversing module 505, and a loop polarity reversing counter 507.

The current detection module 501 is for detecting variations of loop current at the U interface, in the embodiment, the variation of the loop current at the U interface includes that there is loop current and there is no loop current. The loop polarity determining module 503 is for determining whether the loop polarity is correct, and the loop polarity reversing module 505 is started if the loop polarity is incorrect. The loop polarity reversing module 505 is for reversing the loop polarity of the line terminal 10. The loop polarity reversing counter 507 is for recording reversing times of the loop polarity.

The loop polarity determining module 503 includes a second timer 5031, a fourth judging sub-module 5033, a fifth judging sub-module 5035, a first timer 5037, a first judging sub-module 5039, and a frame detection sub-module 5041.

The second timer 5031 is for recording a system time when detecting a variation of the loop current. In the embodiment, the second timer 5031 records every system time in a first queue having M+1 sequences in sequence, and records the system time when the system varies for a (i+1)th time in an ith sequence of the first queue (i=1, 2, ... M+1).

The fourth judging sub-module 5033 is for judging whether a first sequence of the first queue is 0, and judging whether a time difference $T_m$ of M times continuous variations of the loop current is less than a preset second threshold value according to the system time recorded by the second timer 5031. If the time difference $T_m$ is less than the preset second threshold value, the fourth judging sub-module 5033 records the system time when the system varies for the (M+1) th time in a $T_0$ sequence of a second queue having two sequences, records an original $T_0$ sequence in a $T_1$ sequence of the second queue, and resets the first queue to 0. In the embodiment, the preset second threshold value is equal to (M*A+x) ms, wherein the value A is equal to 40 ms, and the value x is a system error value. The $T_0$ sequence is a first sequence of the second queue, and the $T_1$ sequence is a second sequence of the second queue.

The fifth judging sub-module 5035 is for judging whether a value of the $T_1$ sequence of the second queue is 0, and judging whether a difference value between the $T_0$ sequence and the $T_1$ sequence is greater than the preset second threshold value when the $T_1$ sequence is not 0. In the embodiment, if the difference value between the $T_0$ sequence and the $T_1$ sequence is greater than the preset second threshold value, the loop polarity reversing counter 507 is reset to 0, the loop polarity reversing module 505 reverses the loop polarity of the U interface, and the loop polarity reversing counter 507 is automatically incremented by 1. If the $T_1$ sequence is 0, the loop polarity reversing module 505 directly reverses the loop polarity of the U interface.

The first timer 5037 is for timing according to a first preset cycle time. In the embodiment, if the fourth judging sub-module 5033 judges that a first sequence of the first queue is 0, or the time difference $T_m$ of M times continuous variations of the loop current is greater than the preset second threshold value, the first timer 5037 is triggered; or if the loop polarity reversing counter 507 is automatically incremented by 1, the first timer 5037 is triggered; or if a value of the loop polarity reversing counter 507 is greater than or equal to a preset value B, the first timer 5037 is triggered. In the embodiment, the value B is a preset value, and is greater than or equal to 2.

The first judging sub-module 5039 is for judging whether the first timer 5037 has elapsed. In the embodiment, if the first timer 5037 has not elapsed, the current detection module 501 detects whether there is loop current. If there is loop current, the frame detection sub-module 5041 is started.

The frame detection sub-module 5041 is for detecting whether frames between a line terminal 10 and a digital service unit 20 are synchronized. In the embodiment, if the first timer 5037 has elapsed, than the loop polarity reversing module 505 reverses the loop polarity of the U interface of the line terminal 10.

Figure 6:
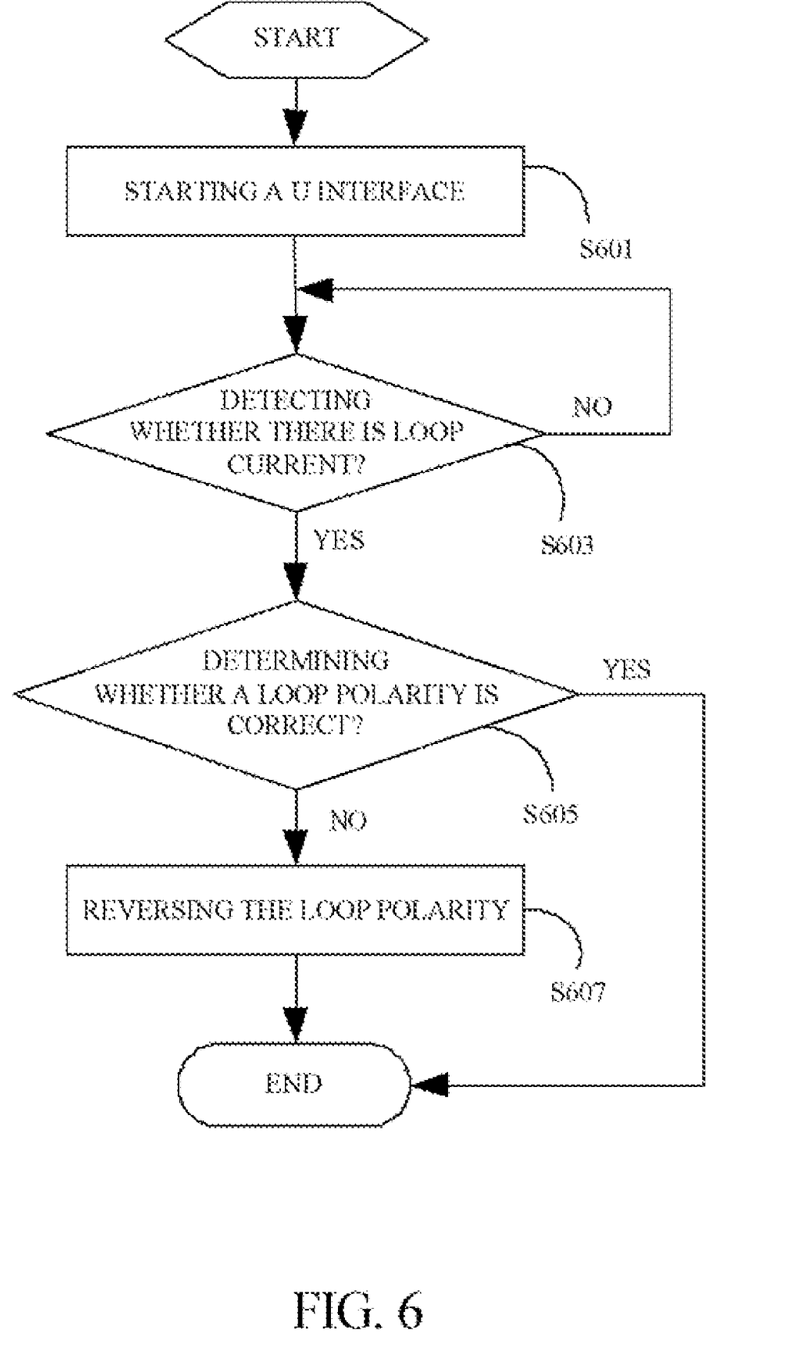
FIG. 6 is a flowchart of a loop polarity auto-reversing method of a U interface of an exemplary embodiment of the present invention.

FIG. 6 is a flowchart of a loop polarity auto-reversing method of the U interface of FIG. 1. In step S601, the U interface is started to connect to the line terminal 10 and the digital service unit 20. In step S603, the current detection module 101 detects whether there is loop current at the U interface of the line terminal 10. If there is no loop current, the current detection module 101 continues to detect. In step S605, the loop polarity determining module 103 determines whether a loop polarity of the U interface is correct, while there is loop current. If the loop polarity determining module 103 determines that the loop polarity is incorrect, then the process proceeds to step S607, the loop polarity reversing module 105 reverses the loop polarity of the U interface of the line terminal 10. If the loop polarity is correct, the whole process ends.

Figure 7:
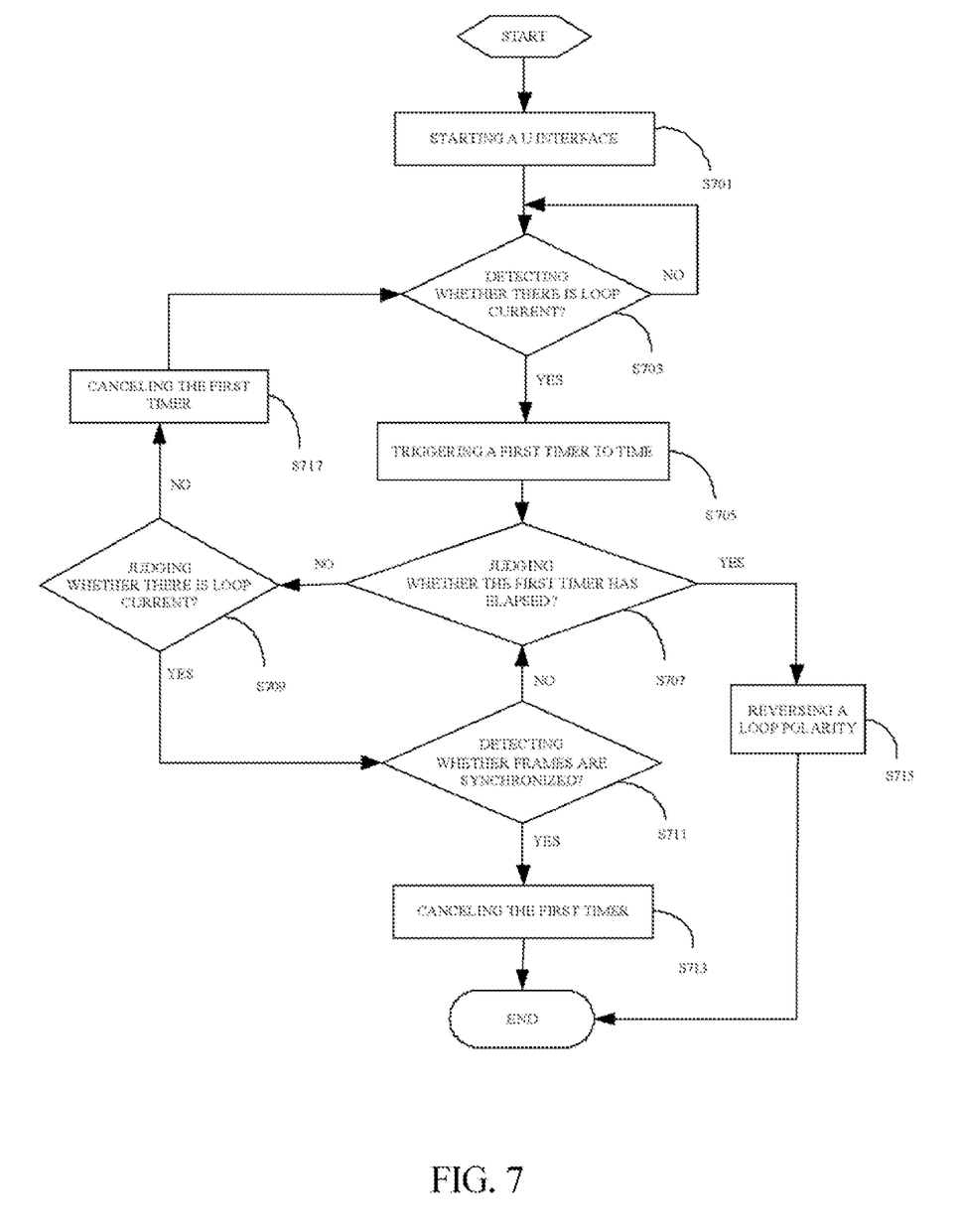
FIG. 7 is a flowchart of a loop polarity auto-reversing method of a U interface of another exemplary embodiment of the present invention.

FIG. 7 is a flowchart of a loop polarity auto-reversing method of the U interface of FIG. 2. In step S701, the U interface is started to connect to the line terminal 10 and the digital service unit 20. In step S703, the current detection module 201 detects whether there is loop current at the U interface of the line terminal 10. If there is no loop current, the current detection module 201 continues to detect. In step S705, the first timer 2031 is triggered to time if there is loop current. In step S707, the first judging sub-module 2033 judges whether the first timer 2031 has elapsed. If the first timer 2031 has elapsed, the process proceeds to step S715, and the loop polarity reversing module 205 reverses the loop polarity of the U interface of the line terminal 10.

If the first timer 2031 has not elapsed, the process proceeds to step S709, the current detection module 201 judges whether there is loop current. If there is loop current, the process proceeds to step S711, the frame detection sub-module 2035 detects whether the frames between the line terminal 10 and the digital service unit 20 are synchronized. If the frames are not synchronized, the process returns to step S707, the first judging sub-module 2033 continues to judge whether the first timer 2031 has elapsed. If the frames are synchronized, then the process proceeds to step S713, the first timer 2031 is canceled.

In step S709, if there is no loop current, then the process proceeds to step S717, the first timer 2031 is canceled, and the process returns to step S703, the current detection module 201 continues to detect whether there is loop current at the line terminal 10.

Figure 8:
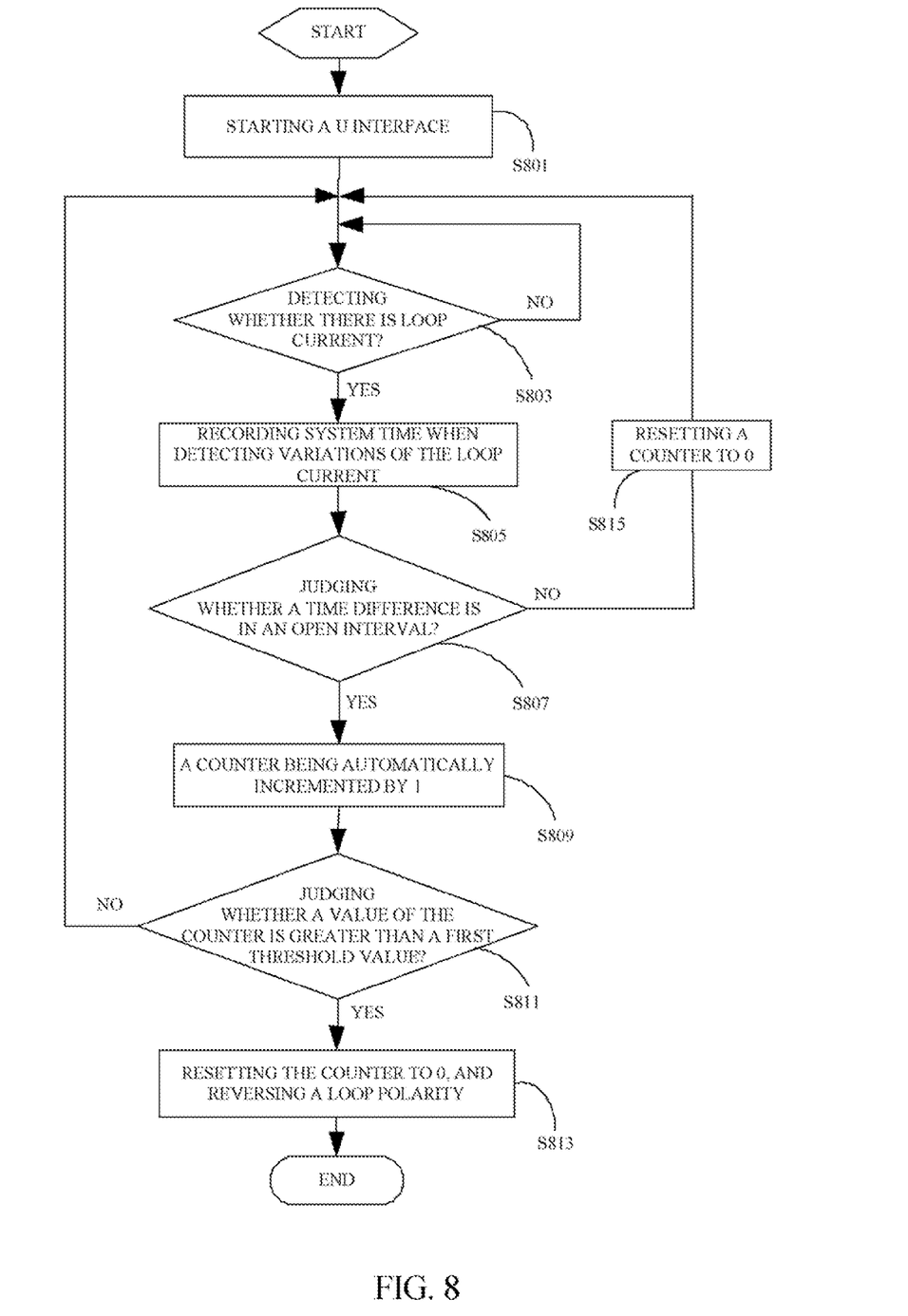
FIG. 8 is a flowchart of a loop polarity auto-reversing method of a U interface of a further exemplary embodiment of the present invention.

FIG. 8 is a flowchart of a loop polarity auto-reversing method of the U interface of FIG. 3. In step S801, the U interface is started to connect to the line terminal 10 and the digital service unit 20. In step S803, the current detection module 301 detects the variations of the loop current at the U interface. In the embodiment, the variation of the loop current at the U interface includes that there is loop current and there is no loop current. In step S805, the second timer 3031 records the system time when detecting the variations of the loop current. In step S807, the second judging sub-module 3033 judges whether the time difference $T_d$ of two continuous variations of the loop current is in the open interval (A−x, A+x) ms. In the embodiment, the value A is a preset value, i.e. 40 ms, and the value x is a system error value. In step S809, if the time difference $T_d$ is in the open interval (A−x, A+x) ms, the counter 3035 is automatically incremented by 1. In step S811, the third judging sub-module 3037 judges whether the value of the counter 3035 is greater than a preset first threshold value. In the embodiment, for example, the preset first threshold value is 8. In step S813, if the value of the counter 3035 is greater than the preset first threshold value, the counter 3035 is reset to 0, and the loop polarity reversing module 305 reverses the loop polarity of the U interface.

In the step S811, if the value of the counter 3035 is less than the preset first threshold value, then the process returns to the step S803, the current detection module 301 continuous to detect the loop current at the U interface.

In the step S807, if the time difference $T_d$ is not in the open interval (A−x, A+x) ms, then the process proceeds to step S815, the counter 3035 is reset to 0, and the process returns to the step S803, the current detection module 301 continuous to detect the loop current at the U interface.

Figure 9:
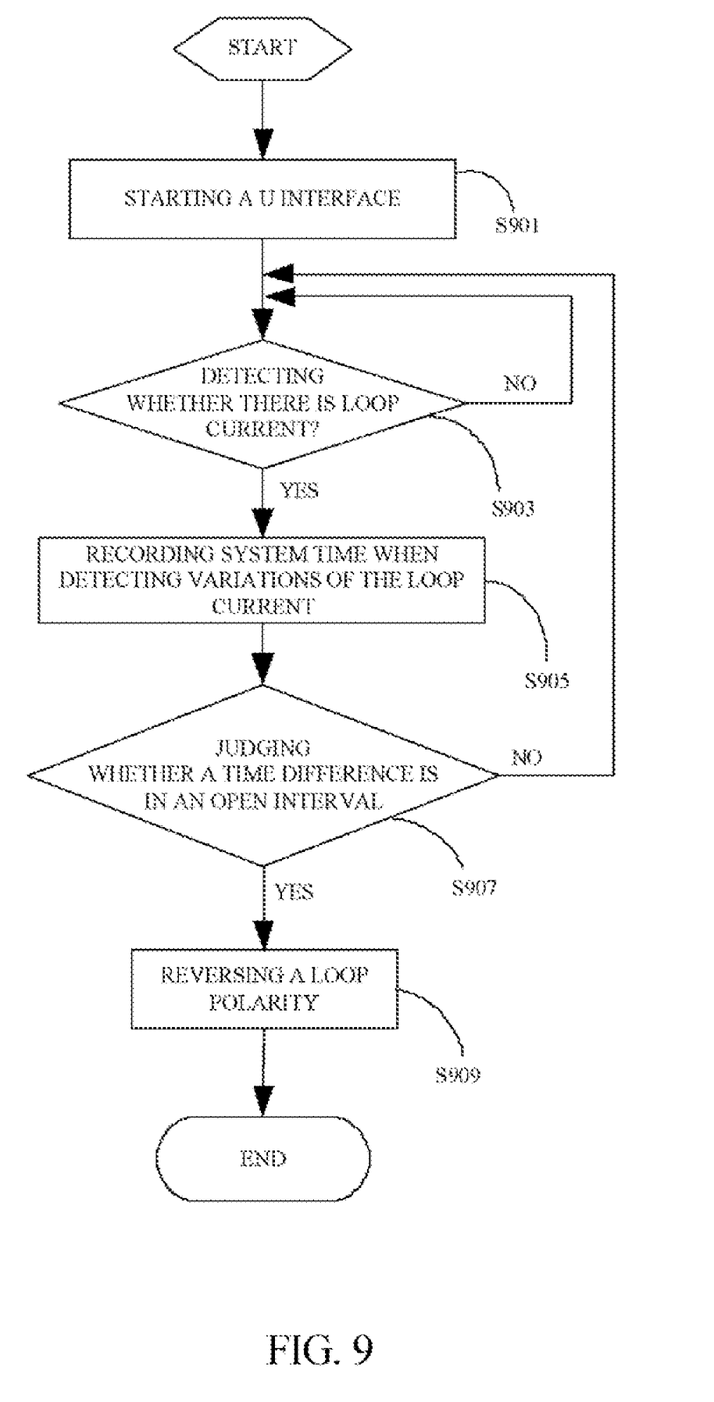
FIG. 9 is a flowchart of a loop polarity auto-reversing method of a U interface of a still further exemplary embodiment of the present invention.

FIG. 9 is a flowchart of a loop polarity auto-reversing method of the U interface of FIG. 4. In step S901, the U interface is started to connect to the line terminal 10 and the digital service unit 20. In step S903, the current detection module 401 detects the variations of the loop current at the U interface. In step S905, the second timer 4031 records the system time when detecting the loop current variations. In the embodiment, the second timer 4031 records every system time in the first queue having M+1 (M=1, 2, 3 . . . ) sequences, and records the system time when the system varies for the (i+1)th time in the ith sequence of the first queue (i=1, 2, . . . M+1).

In step S907, the fourth judging sub-module 4033 judges whether the time difference $T_m$ of M times continuous variations of the loop current is less than the preset second threshold value. In the embodiment, the second threshold value is equal to (M*A+x) ms, wherein the value A is equal to 40 ms, and the value x is a system error value. If the time difference $T_m$ of M times continuous variations of the loop current is less than the preset second threshold value, then the process proceeds to step S909, the loop polarity reversing module 405 reverses the loop polarity of the U interface.

In step S907, If the time difference $T_m$ of M times continuous variations of the loop current is greater than or equal to the preset second threshold value, then the process returns to the step S903, the current detection module 401 continuous to detect the loop current at the U interface.

Figure 10:
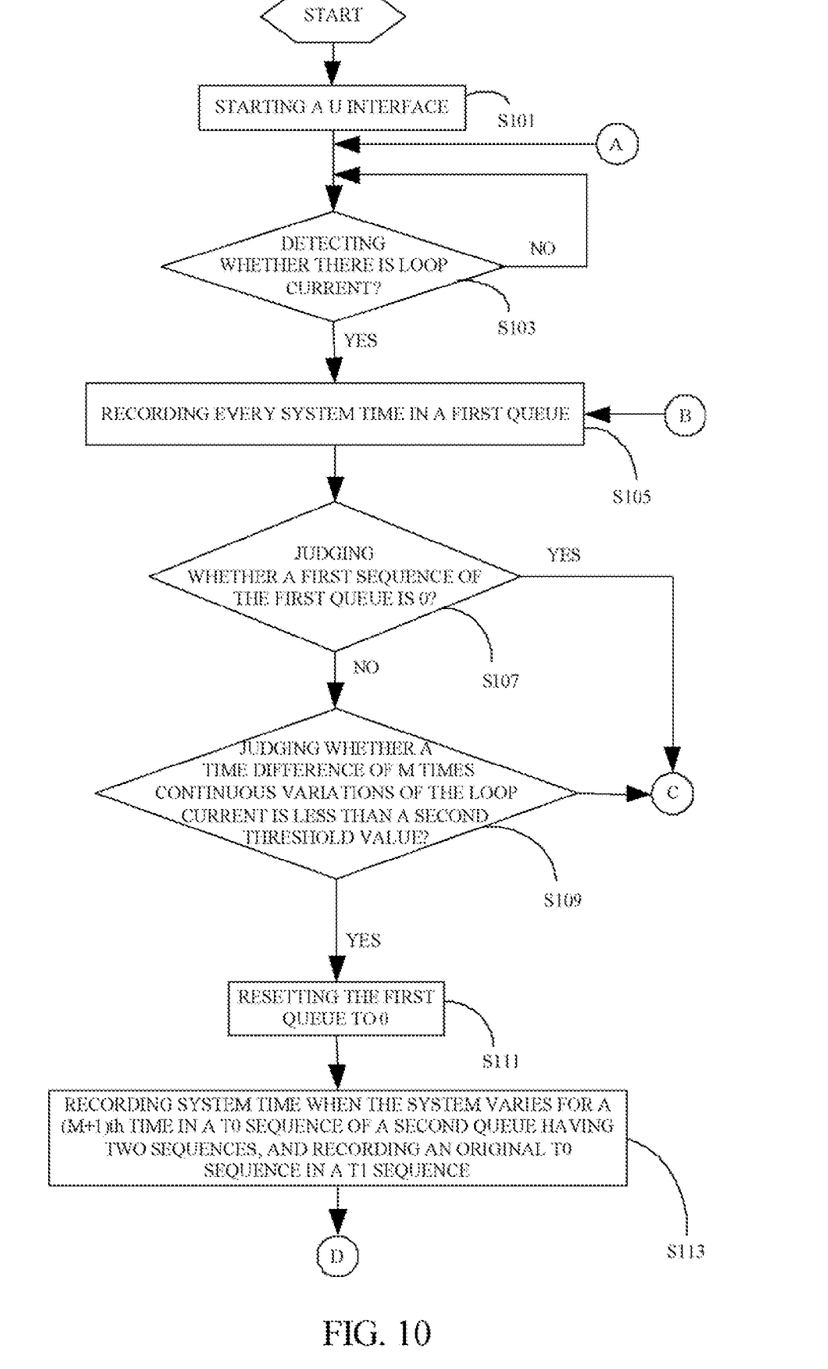
FIG. 10 is a flowchart of a loop polarity auto-reversing method of a U interface of a yet further exemplary embodiment of the present invention.

FIG. 10 is a flowchart of a loop polarity auto-reversing method of the U interface of FIG. 5. In step S101, the U interface is started to connect to the line terminal 10 and the digital service unit 20. In step S103, the current detection module 501 detects the loop current at the U interface. In step S105, the second timer 5031 records the system time when detecting the variation of the loop current. In the embodiment, the second timer 5031 records every system time in the first queue having M+1 (M=1, 2, 3 . . . ) sequences, and records the system time when the system varies for the (i+1)th time in the ith sequence of the first queue (i=1, 2, . . . M+1).

In step S107, the fourth judging sub-module 5033 judges whether the value of the first sequence of the first queue is 0. If the value of the first sequence of the first queue is 0, then the process proceeds to node C. If the value of the first sequence of the first queue is not 0, then the process proceeds to step S109, the fourth judging sub-module 5033 judges whether the time difference $T_m$ of M times continuous variations of the loop current is less than the preset second threshold value. In the embodiment, the preset second threshold value is equal to (M*A+x) ms, wherein the value A is equal to 40 ms, and the value x is a system error value. If the time difference $T_m$ is less than the preset second threshold value, then the process proceeds to step S111, the first queue is reset to 0. In step S113, the system time when the system varies for the (M+1)th time is recorded in the $T_0$ sequence of the second queue having two sequences, and the original $T_0$ sequence is recorded in the $T_1$ sequence of the second queue.

Figure 11:
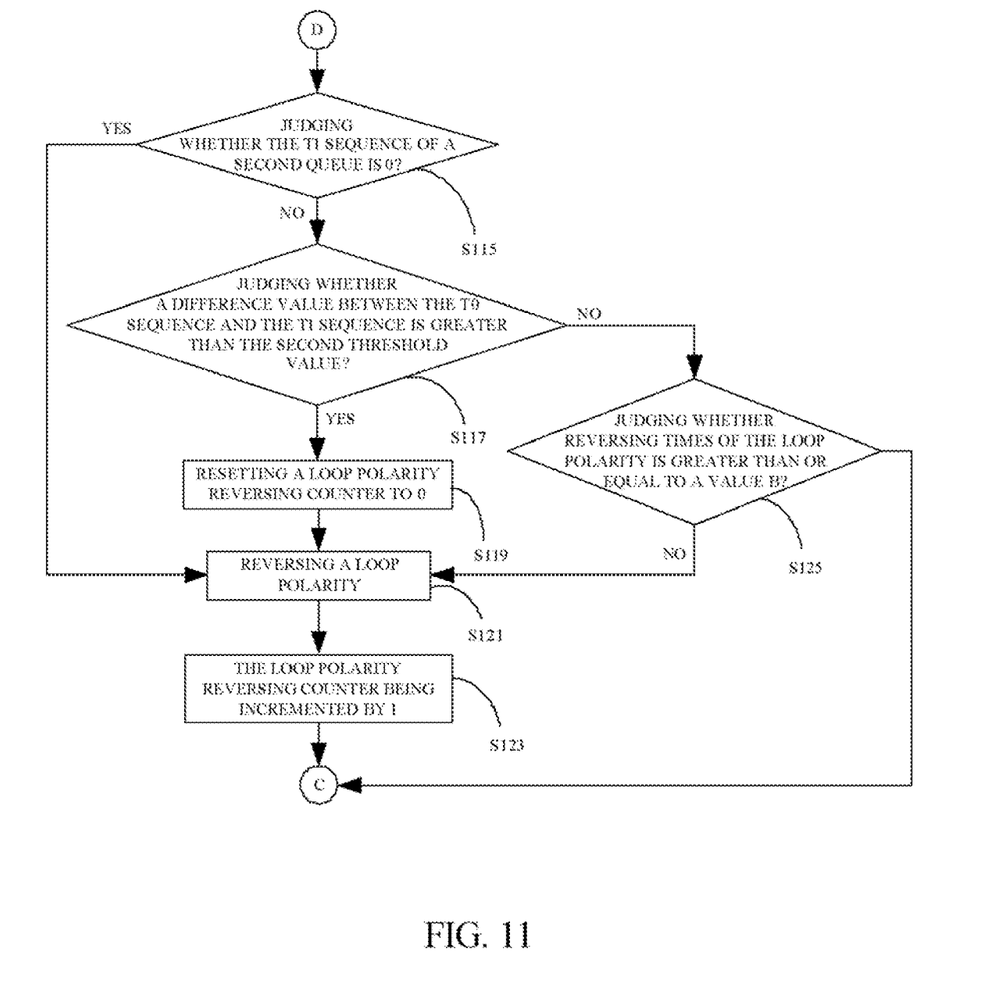
FIG. 11 is a flowchart after node D of FIG. 10.

FIG. 11 is a flowchart after node D of FIG. 10. The process proceeds from node D to step S115, the fifth judging sub-module 5035 judges whether the value of the $T_1$ sequence of the second queue is 0. If the value of the $T_1$ sequence is not 0, then the process proceeds to step S117, the fifth judging sub-module 5035 judges whether the difference value between the $T_0$ sequence and the $T_1$ sequence is greater than the preset second threshold value. If the difference value between the $T_0$ sequence and the $T_1$ sequence is greater than the preset second threshold value, then the process proceeds to step S119, the loop polarity reversing counter 507 is reset to 0.

In step S121, after resetting the loop polarity reversing counter 507 to 0, the loop polarity reversing module 505 reverses the loop polarity of the U interface. In step S123, the loop polarity reversing counter 507 is automatically incremented by 1, then the process proceeds from node C to step S201 of FIG. 12.

In step S117, if the difference value between the $T_0$ sequence and the $T_1$ sequence is less than or equal to the preset second threshold value, then the process proceeds to step S125, the loop polarity reversing counter 507 judges whether the reversing times of the loop polarity is greater than or equal to the value B. In the embodiment, the value B is a preset value, and is greater than or equal to 2.

If the reversing times of the loop polarity is less than the value B, then the process proceeds to the step S121, and the loop polarity reversing module 505 reverses the loop polarity of the U interface. If the reversing times of the loop polarity is greater than or equal to the value B, then the process proceeds to the node C.

Figure 12:
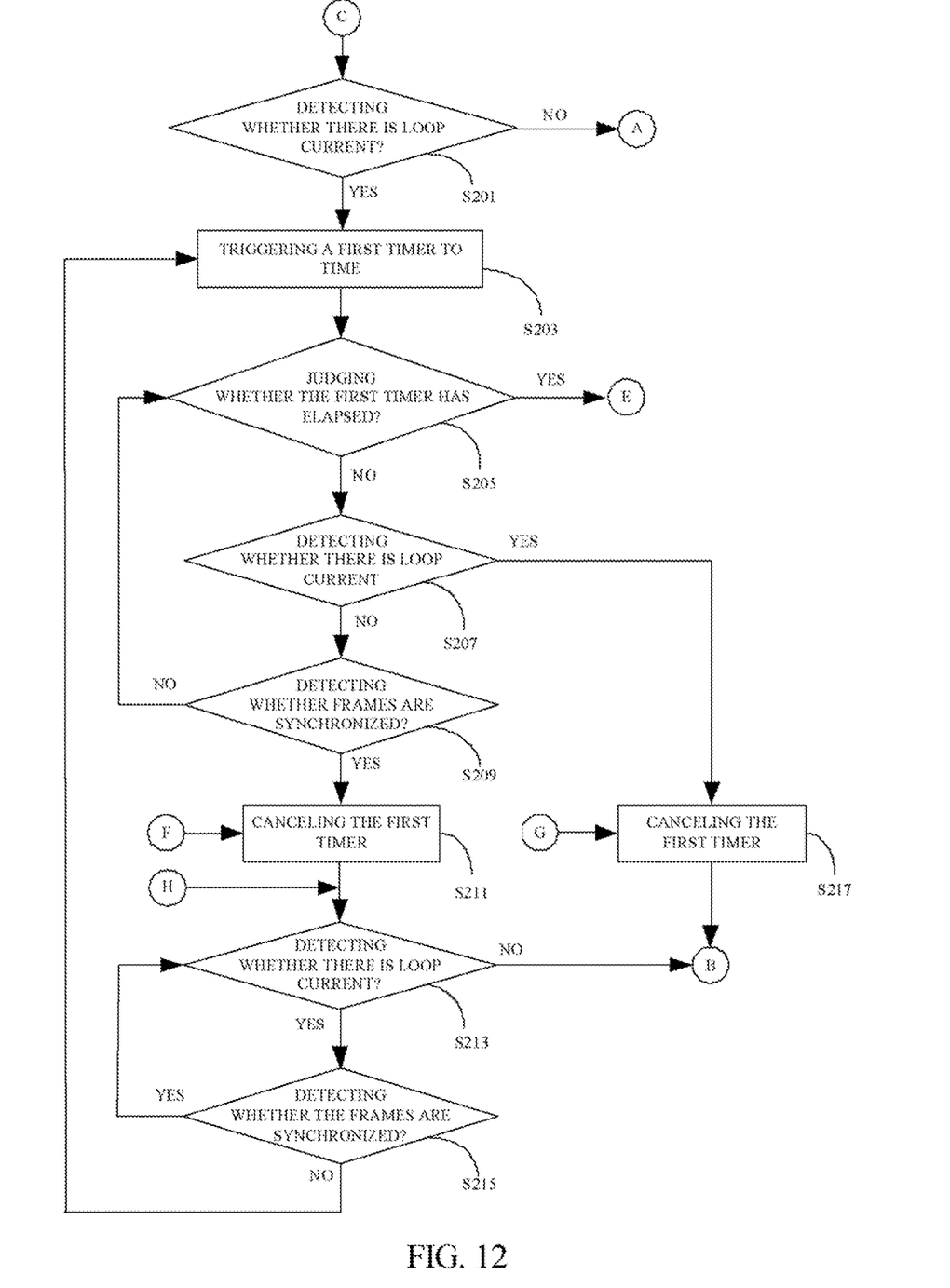
FIG. 12 is a flowchart after node C of FIG. 10.

FIG. 12 is a flowchart after node C of FIG. 10. After the step S107, or S109, or S123, or S125, the process of the loop polarity auto-reversing method of the U interface proceeds from node C to step S201. In step S201, the current detection module 501 detects whether there is loop current. If there is loop current, the process proceeds to step S203, the first timer 5037 is triggered to time.

In step S205, the fifth judging sub-module 5035 judges whether the first timer 5037 has elapsed. If the first timer 5037 has not elapsed, then the process proceeds to step S207, the current detection module 501 detects whether there is loop current. If there is loop current, the process proceeds to step S209, the frame detection sub-module 5041 detects whether the frames between the line terminal 10 and the digital service unit 20 are synchronized. If the frames are synchronized, the process proceeds to step S211, the first timer 5037 is canceled.

In step S213, after canceling the first timer 5037, the current detection module 501 continues to detect whether there is loop current. If there is no loop current, then the process proceeds to node B; if there is loop current, the process proceeds to step S215, the frame detection sub-module 5041 detects whether the frames between the line terminal 10 and the digital service unit 20 are synchronized. If the frames are synchronized, then the process returns to the step S213; whereas, the process returns to the step S203.

In the step S205, if the first timer 5037 has elapsed, the process proceeds to node E.

In the step S207, if there is no loop current, the process proceeds to step S217, the first timer 5037 is canceled, and the process proceeds to the node B.

In the step S209, if the frames are not synchronized, the process returns to the step S205.

In the step S201, if there is no loop current, the process proceeds to node A, and returns to the step S103 of FIG. 10.

Figure 13:
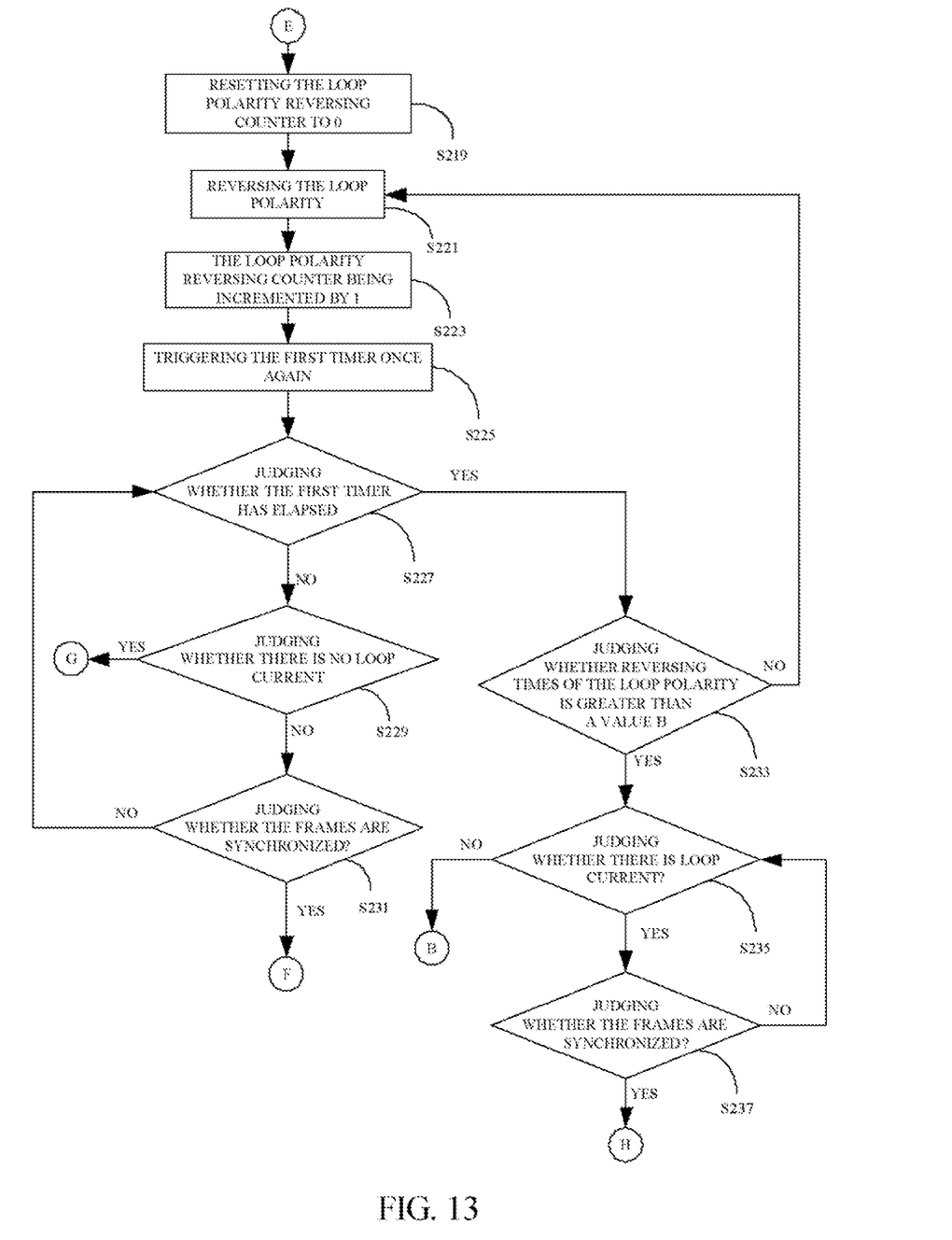
FIG. 13 is a flowchart after node E of FIG. 12.

FIG. 13 is a flowchart after node E of FIG. 12. In step S219, the loop polarity reversing counter 507 is reset to 0. In step S221, the loop polarity reversing module 505 reverses the loop polarity of the U interface. In step S223, the loop polarity reversing counter 507 is automatically incremented by 1. In step S225, the first timer 5037 is triggered once again.

In step S227, the first judging sub-module 5039 judges whether the first timer 5037 has elapsed. If the first timer 5037 has not elapsed, the process proceeds to step S229, the current detection module 501 detects whether there is loop current. If there is loop current, the process proceeds to step S231, the frame detection sub-module 5041 detects whether the frames between the line terminal 10 and the digital service unit 20 are synchronized. If the frames are synchronized, the process proceeds to node F, and returns to the step S211 of FIG. 12; whereas, returns to the step S227.

In step S229, if there is no loop current, the process proceeds to node G, and returns to the step S217 of FIG. 12.

In step S227, if the first timer 5037 has elapsed, then the process proceeds to step S233, the loop polarity reversing counter 507 judges whether the reversing times of the loop polarity is greater than or equal to the value B. In the embodiment, the value B is a preset value, and is greater than or equal to 2. If the reversing times of the loop polarity is greater than or equal to the value B, then the process proceeds to the step S235, and the current detection module 501 detects whether there is loop current.

If there is loop current, then the process proceeds to step S237, the frame detection sub-module 5041 detects whether the frames between the line terminal 10 and the digital service unit 20 are synchronized. If the frames are synchronized, then the process proceeds to node H, and returns to the step S213 of FIG. 12; whereas, returns to the step S235, the current detection module 501 continues to detect whether there is loop current.

In the step S233, if the reversing times of the loop polarity is less than the value B, then the process returns to the step S221, and the loop polarity reversing module 505 reverses the loop polarity of the U interface.

In the step S235, if there is no loop current, then the process proceeds to node B, and returns to the step S105 of FIG. 10.

In the exemplary embodiment of the present invention, to avoid the line terminal 10 and the digital service unit 20 abnormally working, the loop polarity determining module 103, 203, 303, 403, 503 determines whether the loop polarity is correct, and if the loop polarity is incorrect, the loop polarity can be automatically reversed.

While exemplary embodiments have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A loop polarity auto-reversing system of a U interface disposed in a line terminal connected to a digital service unit via the U interface, the loop polarity auto-reversing system comprising:
a current detection module for detecting whether there is loop current at the U interface and detecting variations of the loop current at the U interface;

a loop polarity determining module for determining whether a loop polarity of the U interface is correct if there is loop current, the current detection module comprising:

a first timer for recording a system time when the current detection module detects the variation of the loop current at the U interface;

a second judging sub-module for judging whether a time difference of two continuous variations of the loop current is in an open interval (A−x, A+x) ms according to the system time recorded by the first timer, wherein the value A is a preset value, and the value x is a system error value;

a counter for recording times that the time difference is in the open interval (A−x, A+x) ms; and a third judging sub-module for judging whether the times recorded by the counter is greater than a preset threshold value, resetting the counter to 0, and starting the loop polarity reversing module if the times of the counter is greater than the preset threshold value; and a loop polarity reversing module for reversing the loop polarity of the U interface if the loop polarity is incorrect.

2. The loop polarity auto-reversing system of claim 1, wherein the first timer is also used for recording every system time in a queue having M+1 sequences, and recording the system time when the system varies for a (i+1)th time in an ith sequence of the queue (i=1, 2, . . . M+1).

3. The loop polarity auto-reversing system of claim 2, wherein the loop polarity determining module further comprises a third judging sub-module for judging whether a time difference of M times continuous variations of the loop current is less than a preset threshold value according to the system time recorded by the first timer, the queue is reset to 0, and the loop polarity reversing module is started if the time difference is less than the preset threshold value.

4. A loop polarity auto-reversing method of a U interface implemented in a line terminal connected to a digital service unit via the U interface, the loop polarity auto-reversing method comprising:

detecting whether there is loop current at the U interface of the line terminal;

recording a system time when detecting a variation of the loop current;

judging whether a time difference of two continuous variations of the loop current is in an open interval (A−x, A+x) ms, wherein the value A is a preset value, and the value x is a system error value;

if the time differences are in the open interval (A−x, A+x) ms, recording times that the time differences are in the open interval (A−x, A+x) ms in a counter;

judging whether a value of the counter is greater than a preset first threshold value; and reversing the loop polarity of the U interface of the line terminal if the value of the counter is greater than the preset first threshold value.

5. The loop polarity auto-reversing method of claim 4, further comprising:

recording every system time in a first queue having M+1 (M=1, 2, 3 . . . ) sequences, and recording the system time when the system varies for a (i+1)th time in an ith sequence of the first queue (i=1, 2, . . . M+1);

judging whether a time difference of M times continuous variations of the loop current is less than a preset second threshold value; and reversing the loop polarity of the U interface of the line terminal if the time difference of M times continuous variations of the loop current is less than the preset second threshold value.

6. A loop polarity auto-reversing system of a U interface disposed in a line terminal connected to a digital service unit via the U interface, the loop polarity auto-reversing system comprising:

a current detection module for detecting variations of loop current at the U interface;

a loop polarity determining module for determining whether a loop polarity of the U interface is correct if there is loop current, the current detection module comprising:

a first timer for recording a system time when detecting the variation of the loop current, recording every system time in a first queue having M+1 (M=1, 2, 3 . . . ) sequences, and recording the system time when the system time varies for a (i+1)th time in an ith sequence of the first queue (i=1, 2, . . . M+1);

a fourth judging sub-module for judging whether a time difference of M times continuous variations of the loop current is less than a preset threshold value, wherein if the time difference is less than the preset threshold value, the first queue is reset to 0, the system time when the system varies for a (M+1)th time is recorded in a $T_0$ sequence of a second queue having two sequences, and an original $T_0$ sequence is recorded in a $T_1$ sequence of the second queue; and a fifth judging sub-module for judging whether the $T_1$ sequence of the second queue is 0, and judging whether a difference value between the $T_0$ sequence and the $T_1$ sequence is greater than the preset threshold value if the $T_1$ sequence is not 0;

a loop polarity reversing module for reversing the loop polarity of the line terminal if the loop polarity is incorrect; and a loop polarity reversing counter for recording reversing times of the loop polarity, and being incremented by 1 after the loop polarity reversing module reversing the loop polarity;

wherein if the difference value between the $T_0$ sequence and the $T_1$ sequence is greater than the preset threshold value, the loop polarity reversing counter is reset to 0, and the loop polarity reversing module is started.

7. The loop polarity auto-reversing system of claim 6, wherein the fifth judging sub-module is further used for judging whether the reversing times of the loop polarity reversing counter is greater than or equal to the preset threshold value, if the difference value between the $T_0$ sequence and the $T_1$ sequence is less than a preset value.

8. The loop polarity auto-reversing system of claim 7, wherein the loop polarity determining module further comprises:

a second timer for timing according to a preset cycle time when the time difference of M times continuous variations of the loop current is greater than the preset threshold value;

a first judging sub-module for judging whether the second timer has elapsed; and a frame detection sub-module for detecting whether frames between the line terminal and the digital service unit are synchronized.

9. A loop polarity auto-reversing method of a U interface implemented in a line terminal connected to a digital service unit via the U interface, the loop polarity auto-reversing method comprising:

detecting whether there is loop current at the U interface of the line terminal;

recording every system time in a first queue having M+1 (M=1, 2, 3 . . . ) sequences, and recording the system time when the system varies for a (i+1)th time in an ith sequence of the first queue (i=1, 2, . . . M+1);

judging whether a first sequence of the first queue is 0;

if the first sequence of the first queue is not 0, judging whether a time difference of M times continuous variations of the loop current is less than a preset threshold value;

if the time difference is less than the preset threshold value, resetting the first queue to 0, recording the system time when the system varies for a (M+1)th time in a $T_0$ sequence of a second queue having two sequences, and recording an original $T_0$ sequence in a $T_1$ sequence of the second queue;

judging whether the $T_1$ sequence of the second queue is 0;

if the $T_1$ sequence of the second queue is 0, reversing the loop polarity of the U interface of the line terminal; and a counter being automatically incremented by 1.

10. The loop polarity auto-reversing method of claim 9, further comprising:

if the $T_1$ sequence of the second queue is not 0, judging whether a difference value between the $T_0$ sequence and the $T_1$ sequence is greater than the preset threshold value;

if the difference value between the $T_0$ sequence and the $T_1$ sequence is less than the preset threshold value, judging whether reversing times of the loop polarity is greater than or equal to a preset value, wherein the preset value is greater than or equal to 2;

if the reversing times of the loop polarity is less than the preset value, reversing the loop polarity of the U interface of the line terminal; and the counter being automatically incremented by 1.

11. The loop polarity auto-reversing method of claim 10, further comprising detecting whether there is loop current, if the $T_1$ sequence of the second queue is 0, or if the reversing times of the loop polarity is greater than or equal to the preset value, or if the time difference is greater than or equal to the preset threshold value.

12. The loop polarity auto-reversing method of claim 11, further comprising:

triggering a timer to time according to a preset cycle time;

judging whether the timer has elapsed;

if the timer has not elapsed, judging whether there is loop current;

if there is loop current, detecting whether frames between the line terminal and the digital service unit are synchronized; and if the frames between the line terminal and the digital service unit are not synchronized, judging whether the timer has elapsed.

13. The loop polarity auto-reversing method of claim 12, further comprising if the frames between the line terminal and the digital service unit are synchronized, cancelling the timer.

* * * * *